(12) United States Patent
Rácz et al.

(10) Patent No.: US 12,489,535 B2
(45) Date of Patent: Dec. 2, 2025

(54) TECHNIQUE FOR PREDICTING RADIO QUALITY

(71) Applicant: Telefonaktiebolaget LM Ericsson (publ), Stockholm (SE)

(72) Inventors: András Rácz, Budapest (HU); Tamas Borsos, Budapest (HU); András Veres, Budapest (HU); Peter Vaderna, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 18/023,530

(22) PCT Filed: Aug. 28, 2020

(86) PCT No.: PCT/SE2020/050826
§ 371 (c)(1),
(2) Date: Feb. 27, 2023

(87) PCT Pub. No.: WO2022/045939
PCT Pub. Date: Mar. 3, 2022

(65) Prior Publication Data
US 2023/0361897 A1 Nov. 9, 2023

(51) Int. Cl.
*H04B 17/373* (2015.01)
*H04W 64/00* (2009.01)

(52) U.S. Cl.
CPC .......... *H04B 17/373* (2015.01); *H04W 64/00* (2013.01)

(58) Field of Classification Search
CPC .............................. H04B 17/373; H04W 64/00
See application file for complete search history.

(56) References Cited

U.S. PATENT DOCUMENTS

2017/0094520 A1 3/2017 Salyers et al.
2019/0342763 A1* 11/2019 Jung .................... H04B 17/309

FOREIGN PATENT DOCUMENTS

CN 108810911 A 11/2018
EP 3509231 A1 7/2019
(Continued)

OTHER PUBLICATIONS

International Search Report and Written Opinion for International Patent Application No. PCT/SE2020/050826, mailed Apr. 26, 2021, 12 pages.

*Primary Examiner* — Natasha W Cosme
(74) *Attorney, Agent, or Firm* — Withrow & Terranova, PLLC (57) ABSTRACT

A technique for predicting radio quality in a wireless communication network depending on assumed positions of one or more base stations in an area to be covered by the wireless communication network is disclosed. A method implementation of the technique is performed by a computing unit and comprises the steps of determining, for a selected position in the area with respect to assumed positions of the one or more base stations, blocking object features indicative of a spatial pattern of blocking objects present in fields of view between the selected position and the assumed positions of the one or more base stations, and determining, based on the determined blocking object features, a predicted radio quality at the selected position using a machine learning model trained to map blocking object features for selected positions with respect to one or more base station positions to corresponding radio qualities at the selected positions.

18 Claims, 7 Drawing Sheets

(56) References Cited

FOREIGN PATENT DOCUMENTS

| WO | 2019074640 A1 | 4/2019 |
|----|---------------|--------|
| WO | 2019164608 A1 | 8/2019 |
| WO | 2020170237 A1 | 8/2020 |

* cited by examiner

Train a machine learning model using training data comprising a plurality of sets of blocking object features as input data, each set of blocking object features associated with a different position of a wireless device with respect to one or more base stations of a representative wireless communication network, and corresponding radio qualities measured by the wireless device at the different positions as output data, wherein, among the plurality of sets of blocking object features, each set of blocking object features is indicative of a spatial pattern of blocking objects present in fields of view between a current position of the wireless device and the one or more base stations ～ S502

Fig. 7

TECHNIQUE FOR PREDICTING RADIO QUALITY

This application is a 35 U.S.C. § 371 national phase filing of International Application No. PCT/SE2020/050826, filed Aug. 28, 2020, the disclosure of which is incorporated herein by reference in its entirety.

TECHNICAL FIELD

The present disclosure generally relates to wireless communication networks. In particular, a technique for predicting radio quality in a wireless communication network depending on assumed positions of one or more base stations in an area to be covered by the wireless communication network is presented. The technique may be embodied in methods, computer programs, apparatuses and systems.

BACKGROUND

Base station deployment and antenna placement in cellular networks generally requires careful design, especially in mobile communication systems of the fifth generation (5G), where radio communication is carried out over high frequency channels and where connectivity may be used for critical infrastructures, such as factory networks, where high connection reliability may need to be guaranteed. Radio waves having high frequency (i.e., short wavelength) are more easily absorbed by obstacles than lower frequency waves, such as radio waves used in 3G and 4G systems, for example. Therefore, in order to assure radio coverage, the deployment of antennas of base stations should be dense enough and the planning needs to be done carefully (e.g., taking into account objects in the space and how they block/reflect radio waves) to ensure that the radio waves reach each corner of the infrastructure, such as a factory floor, for example. In 5G systems, coverage may also be enhanced using beamforming, i.e., the radio beams may be directed to given directions in order to better focus on potential User Equipment (UE) locations.

In conventional radio network planning, a typical approach involves employing a statistical model of the radio propagation and fading environment (e.g., a Rayleigh channel model) together with a simple model reflecting the attenuation through walls, windows, etc. Such models can be used to plan for average signal strength, particularly in the lower frequency spectrum, for example. Other approaches may use ray tracing methodology and are generally based on simulating the propagation of radio waves in the particular physical space (e.g., including the reflection from objects) and calculating the resulting received signal by the sum of propagations along different paths.

However, traditional approaches of radio network planning are typically unsuitable for cases having more challenging propagation requirements (e.g., involving mmWave technology) and especially when high connection reliability is required. The drawback of the statistical propagation model based planning approach is that the properties of the particular physical environment (e.g., 3-dimensional objects, materials, etc.) normally cannot be taken into account and that, therefore, the approach is inaccurate for the planning of critical infrastructures in the mmWave spectrum domain. Although the ray tracing approach can provide a more accurate model of the received radio signal, it is computationally expensive (practically feasible only with certain simplifications) and accurate enough only if a sufficiently detailed 3-dimensional map of the environment is available. Ray tracing may also significantly overestimate or underestimate the actual radio environment, because it is highly sensitive to the accuracy of the 3-dimensional model of the environment. Due to shorter wavelengths in mid or high frequency bands, the 3-dimensional model needs to be much more accurate than in 3G or 4G systems. Such 3-dimensional model is very difficult to scan, however, even with very expensive Light Detection and Ranging (LIDAR) sensors.

SUMMARY

Accordingly, there is a need for a technique for use in radio network planning which avoids one or more of these problems, or other problems.

According to a first aspect, a method for predicting radio quality in a wireless communication network depending on assumed positions of one or more base stations in an area to be covered by the wireless communication network is provided. The method is performed by a computing unit and comprises the steps of (a) determining, for a selected position in the area with respect to assumed positions of the one or more base stations, blocking object features indicative of a spatial pattern of blocking objects present in fields of view between the selected position and the assumed positions of the one or more base stations, and (b) determining, based on the determined blocking object features, a predicted radio quality at the selected position using a machine learning model trained to map blocking object features for selected positions with respect to one or more base station positions to corresponding radio qualities at the selected positions.

Steps (a) and (b) may be performed for a plurality of different selected positions in the area with respect to the assumed positions of the one or more base stations to thereby obtain predicted radio qualities at the different selected positions, wherein the method may further comprise (c) evaluating, based on the predicted radio qualities, a placement of the one or more base stations in the wireless communication network at the assumed positions. Steps (a) to (c) may be performed for a plurality of different assumed positions of the one or more base stations in the area to thereby obtain evaluations of different placements of the one or more base stations in the wireless communication network, wherein the method may further comprise (d) selecting, based on the evaluations, a placement of the one or more base stations for deployment of the one or more base stations in the wireless communication network.

The spatial pattern of the blocking objects may be determined from a 3-dimensional environment scan performed in the area. Determining the spatial pattern of the blocking objects may comprise taking cross sections of the fields of view at different distances between the selected position and the assumed positions of the one or more base stations, and projecting blocking objects present in the fields of view at a particular distance onto the cross section at the particular distance. Determining the spatial pattern of the blocking objects may comprise calculating, for a cross section at a particular distance, a percentage of the cross section being blocked by blocking objects at the particular distance.

The determined blocking object features may further be indicative of at least one of absorption and reflection properties of the blocking objects present in the fields of view between the selected position and the assumed positions of the one or more base stations. At least one of the absorption and reflection properties of a blocking object may be determined using an image recognition model trained with common blocking objects and at least one of their absorption and reflection properties. Determining the at least one of the absorption and reflection properties of a blocking object may be assisted by a manual marking of the blocking object input by a user on an image showing a field of view between the selected position and the assumed positions of the one or more base stations. At least one of the absorption and reflection properties of a blocking object may be determined from radio measurements performed between a radio transmitter and a radio receiver when being placed iteratively at different positions around the blocking object. The method may further comprise identifying, among blocking objects detected in a 3-dimensional environment scan performed in the area, moveable blocking objects capable of moving in the area, and simulating movement of the movable blocking objects, wherein, in order to obtain a predicted radio quality at a selected position, steps (a) and (b) may be repeatedly performed for different simulated movements of the movable blocking objects.

The machine learning model may be trained using training data comprising a plurality of sets of blocking object features as input data, each set of blocking object features associated with a different position of a wireless device with respect to one or more base stations of a representative wireless communication network, and corresponding radio qualities measured by the wireless device at the different positions as output data. Among the plurality of sets of blocking object features, each set of blocking object features may be indicative of a spatial pattern of blocking objects present in fields of view between the current position of the wireless device and the one or more base stations. The training data may be generated by moving the wireless device in an area of the representative wireless communication network and determining the sets of blocking object features and the corresponding radio qualities at different positions when moving the wireless device in the area. The input data of the training data may further comprise, for each set of blocking features determined for a respective position when moving the wireless device in the area, distance information indicative of distances between the wireless device at the respective position and the one or more base stations.

For a set of blocking object features, the spatial pattern of the blocking objects may be determined from a 3-dimensional environment scan performed in the area of the representative wireless communication network. Determining the spatial pattern of the blocking objects may comprise taking cross sections of the fields of view at different distances between the current position of the wireless device and the one or more base stations, and projecting blocking objects present in the fields of view at a particular distance onto the cross section at the particular distance. Determining the spatial pattern of the blocking objects may comprise calculating, for a cross section at a particular distance, a percentage of the cross section that is blocked by blocking objects at the particular distance.

Among the plurality of sets of blocking object features, each set of blocking object features may further be indicative of at least one of absorption and reflection properties of the blocking objects present in the fields of view between the current position of the wireless device and the one or more base stations. At least one of the absorption and reflection properties of a blocking object may be determined using an image recognition model trained with common blocking objects and at least one of their absorption and reflection properties. Determining at least one of the absorption and reflection properties of a blocking object may be assisted by a manual marking of the blocking object input by a user on an image showing a field of view between the current position of the wireless device and the one or more base stations. At least one of the absorption and reflection properties of a blocking object may be determined from radio measurements performed between a radio transmitter and a radio receiver when being placed iteratively at different positions around the blocking object. At least one of the absorption and reflection properties of a blocking object may be determined from radio measurements performed by the wireless device with respect to the one or more base stations when the blocking object is in the fields of view between the wireless device and the one or more base stations.

According to a second aspect, a method for training a machine learning model configured to predict radio quality in a wireless communication network depending on assumed positions of one or more base stations in an area to be covered by the wireless communication network is provided. The method is performed by a computing unit and comprises training the machine learning model using training data comprising a plurality of sets of blocking object features as input data, each set of blocking object features associated with a different position of a wireless device with respect to one or more base stations of a representative wireless communication network, and corresponding radio qualities measured by the wireless device at the different positions as output data, wherein, among the plurality of sets of blocking object features, each set of blocking object features is indicative of a spatial pattern of blocking objects present in fields of view between a current position of the wireless device and the one or more base stations.

The method according to the second aspect defines a method dedicated to training a machine learning model which, once it is trained, may be employed for the purpose of predicting radio quality in a wireless communication network in the method according to the first aspect. The machine learning model of the second aspect May thus correspond to the machine learning model described above in relation to the first aspect.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit for predicting radio quality in a wireless communication network depending on assumed positions of one or more base stations in an area to be covered by the wireless communication network is provided. The computing unit comprises at least one processor and at least one memory, the at least one memory containing instructions executable by the at least one processor such that the computing unit is operable to perform any of the method steps presented herein with respect to the first aspect.

According to a fifth aspect, a computing unit for training a machine learning model configured to predict radio quality in a wireless communication network depending on assumed positions of one or more base stations in an area to be covered by the wireless communication network is provided. The computing unit comprises at least one processor and at least one memory, the at least one memory containing instructions executable by the at least one processor such that the computing unit is operable to perform any of the method steps presented herein with respect to the second aspect.

According to a sixth aspect, a wireless device for generating training data usable to train a machine learning model for predicting radio quality in a wireless communication network depending on assumed positions of one or more base stations in an area to be covered by the wireless communication network is provided. The wireless device comprises a 3-dimensional environment scanner, and a radio scanner, wherein the wireless device is configured to generate, using the 3-dimensional environment scanner, a plurality of sets of blocking object features as input data for the training data and corresponding radio qualities measured using the radio scanner at the different positions as output data for the training data, wherein each set of blocking object features is associated with a different position of the wireless device with respect to one or more base stations of a representative wireless communication network, and wherein, among the plurality of sets of blocking object features, each set of blocking object features is indicative of a spatial pattern of blocking objects present in fields of view between a current position of the wireless device and the one or more base stations.

According to a seventh aspect, there is provided a computing unit according to the fourth aspect, optionally, a computing unit according to the fifth aspect and, further optionally, a wireless device according to the sixth aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. Those skilled in the art will further appreciate that the steps, services and functions explained herein below may be implemented using individual hardware circuitry, using software functioning in conjunction with a programmed micro-processor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1A:
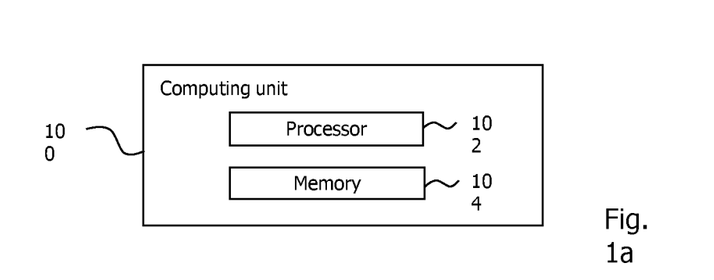
FIGS. 1a and 1b illustrate exemplary compositions of a computing unit for predicting radio quality and a computing unit for training a machine learning model according to the present disclosure.

FIG. 1a schematically illustrates an exemplary composition of a computing unit 100 for predicting radio quality in a wireless communication network depending on assumed positions of one or more base stations in an area to be covered by the wireless communication network. The computing unit 100 comprises at least one processor 102 and at least one memory 104, wherein the at least one memory 104 contains instructions executable by the at least one processor 102 such that the computing unit 100 is operable to carry out the method steps described herein below with reference to the computing unit for predicting radio quality.

Figure 1B:
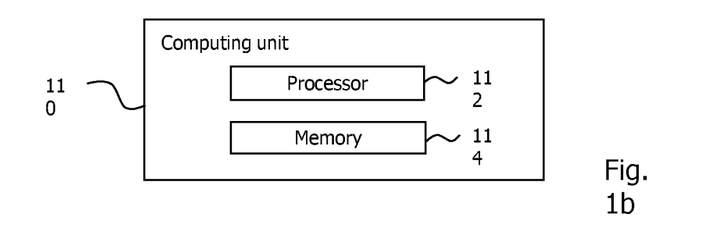

FIG. 1b schematically illustrates an exemplary composition of a computing unit 110 for training a machine learning model configured to predict radio quality in a wireless communication network depending on assumed positions of one or more base stations in an area to be covered by the wireless communication network. The computing unit 110 comprises at least one processor 112 and at least one memory 114, wherein the at least one memory 114 contains instructions executable by the at least one processor 112 such that the computing unit 110 is operable to carry out the method steps described herein below with reference to the computing unit for training a machine learning model.

Figure 2:
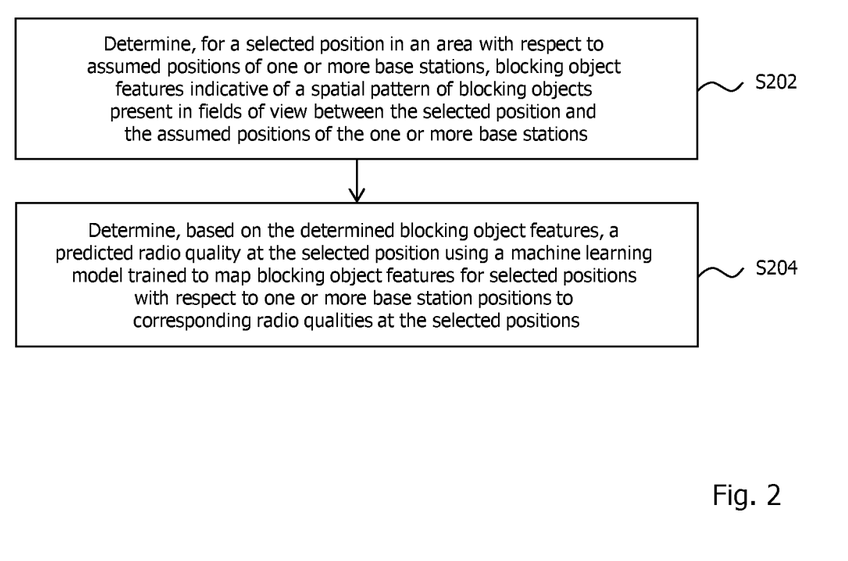
FIG. 2 illustrates a method which may be performed by the computing unit for predicting radio quality according to the present disclosure.

It will be understood that each of the computing unit 100 and the computing unit 110 may be implemented on a physical computing unit or a virtualized computing unit, such as a virtual machine, for example. It will further be appreciated that each of the computing unit 100 and the computing unit 110 may not necessarily be implemented on a standalone computing unit, but may be implemented as components—realized in software and/or hardware—residing on multiple distributed computing units as well, such as in a cloud computing environment, for example. FIG. 2 illustrates a method which may be performed by the computing unit 100 according to the present disclosure. The method is dedicated to predicting radio quality in a wireless communication network depending on assumed positions of one or more base stations in an area to be covered by the wireless communication network. In step S202, the computing unit 100 may (a) determine, for a selected position in the area with respect to assumed positions of the one or more base stations, blocking object features indicative of a spatial pattern of blocking objects present in fields of view between the selected position and the assumed positions of the one or more base stations. In step S204, the computing unit 100 may (b) determine, based on the determined blocking object features, a predicted radio quality at the selected position using a machine learning model trained to map blocking object features for selected positions with respect to one or more base station positions to corresponding radio qualities at the selected positions.

The method may be employed during the planning of a greenfield network deployment, i.e., the installation of one or more base stations (or "access points") to establish a wireless communication network in an area where none existed before. Determining a predicted radio quality at a selected position in the area to be covered by the wireless communication network depending on assumed positions of one or more base stations in the area may be performed to evaluate (or "assess") radio signal coverage at the selected position for an assumed placement/deployment of one or more base stations in the area or, in other words, for a hypothetical installation of the one or more base stations. Such evaluation may be performed for different selected positions in the area to evaluate radio signal coverage throughout the area (e.g., at a plurality of representative positions in the area, the corresponding predicted radio qualities of which may be indicative of the radio signal coverage in the area). Once the evaluation is performed for one hypothetical installation, the installation may be changed to another hypothetical installation, i.e., with assumed positions of the one or more base stations different from the assumed positions of the previous hypothetical installation, and the radio signal coverage throughout the area may be evaluated again for the new hypothetical installation. This process may be repeated until a suitable (or optimal) placement of the one or more base stations is identified.

The above steps (a) and (b) may thus be performed for a plurality of different selected positions in the area with respect to the assumed positions of the one or more base stations to thereby obtain predicted radio qualities at the different selected positions, wherein the method performed by the computing unit 100 may further comprise (c) evaluating, based on the predicted radio qualities, a placement of the one or more base stations in the wireless communication network at the assumed positions. Steps (a) to (c) may then be performed for a plurality of different assumed positions of the one or more base stations in the area to thereby obtain evaluations of different placements of the one or more base stations in the wireless communication network, wherein the method performed by the computing unit 100 may further comprise (d) selecting, based on the evaluations, a placement of the one or more base stations for deployment of the one or more base stations in the wireless communication network. The selection may involve selecting a hypothetical installation which results in a suitable (or best) radio signal coverage throughout the area or, in other words, the selection may involve selecting a placement of the one or more base stations which is associated with a suitable (or best) evaluation, for example. The wireless communication network may be a cellular network, such as a 5G network, for example, but it will be understood that the technique presented herein may be applied with other types of wireless communication networks as well.

For a selected position, the predicted radio quality may be determined using a machine learning model (or, more generally, an artificial intelligence "AI" model) which is trained to map spatial patterns (or "3-dimensional arrangements") of objects potentially blocking radio transmission between an assumed wireless device and one or more assumed base stations to corresponding predicted (or "expected") radio qualities. A predicted radio quality may correspond to a measure indicative of radio quality as perceived by a wireless device, such as an indication of a received signal strength, like a Received Signal Strength Indicator (RSSI), for example. The machine learning model employed to determine the predicted radio qualities may be considered as a radio signal propagation model capable of determining expected radio qualities based on assumed spatial patterns of potential blocking objects between an assumed wireless device and one or more assumed base stations. The model may work on the assumption that similar spatial patterns with similar types of blocking objects (e.g., having same dimensions and/or materials) yield similar radio propagation characteristics perceived by receiving wireless devices.

In order to determine the spatial pattern of blocking objects for a selected position and the assumed positions of the one or more base stations in the area, a 3-dimensional scan of the environment may need to be performed (because the environment may a priori not be known, especially when a greenfield deployment is to be performed). The spatial pattern of the blocking objects may thus be determined from a 3-dimensional environment scan performed in the area. The 3-dimensional environment scan may be performed using conventional techniques, such as using a LIDAR sensor, for example, which measures the environment using light detection and ranging. To collect information on 3-dimensional objects in the environment, a high resolution 3-dimensional LIDAR sensor may be used to assess the exact spatial model of the environment and, from the 3-dimensional point data obtained from the LIDAR sensor, the position of the LIDAR sensor as well as the positions of the objects visible from the path of the LIDAR sensor may be calculated using known techniques, such as using a Simultaneous Localization and Mapping (SLAM) algorithm, for example. The 3-dimensional environment scan may then be performed by moving the LIDAR sensor around in the area and collecting 3-dimensional point data as well as object positions using SLAM technology, for example.

Figure 3:
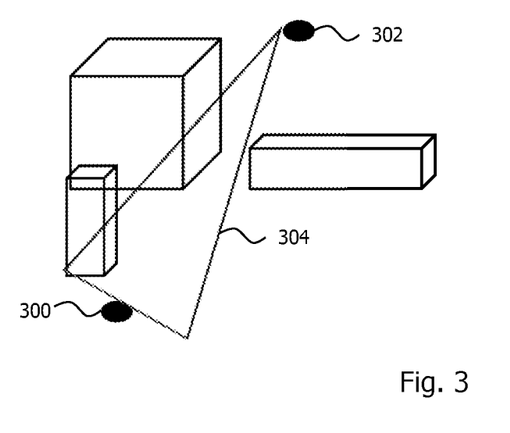
FIG. 3 illustrates an example of a spatial pattern of blocking objects present in a field of view between a selected position, represented by an assumed wireless device, and an assumed base station.

From the scanned 3-dimensional environment, the blocking object features indicative of the spatial pattern of blocking objects present in fields of view between the selected position and the assumed positions of the one or more base stations may then be determined. FIG. 3 illustrates a simple example of a spatial pattern of blocking objects present in a field of view between an assumed selected position 300 (of a wireless device) and an assumed position 302 of a base station. In the shown example, the field of view 304 from the position 302 of the base station to the selected position 300 is taken as a cone drawn from the position 302 of the base station towards the selected position 300. Blocking objects may be those objects in the environment which are present in a field of view between the selected position 300 and the assumed positions 302 of the one or more base stations, i.e., in other words, those objects in the environment which may at least partially block radio transmission from the assumed one or more base stations to a wireless device at the selected position.

In order to describe the spatial pattern of blocking objects present in the fields of view between the selected position and the assumed positions of the one or more base stations, in one variant, cross sections of the fields of view may be taken at certain distances from the respective base stations, and percentages of fractions of the fields of view that are blocked at that distance from the respective base station towards the selected position may be calculated. Determining the spatial pattern of blocking objects may thus comprise taking cross sections of the fields of view at different distances between the selected position and the assumed positions of the one or more base stations, and projecting blocking objects present in the fields of view at a particular distance onto the cross section at the particular distance. Determining the spatial pattern of the blocking objects may then comprise calculating, for a cross section at a particular distance, a percentage of the cross section being blocked by blocking objects at the particular distance. The thus calculated percentages at the different distances of the respective fields of view may then be taken as the blocking object features, i.e., as a set of features that characterizes the spatial pattern of blocking objects falling in the fields of view between the selected position and the assumed positions of the one or more base stations.

In the example of FIG. 3, cross sections of the cone may be taken at different distances between the assumed position 302 of the base station and the selected position 300 of the assumed wireless device and the 3-dimensional object points of the blocking objects falling in a given part of the cone may then be projected onto the surface of the respective cross section. Then, the percentage of the surface that is blocked by some blocking objects may be calculated, which may finally give a feature set that characterizes the spatial pattern of blocking objects present in the fields of view. It will be understood that the situation shown in FIG. 3, which shows a single field of view between an assumed wireless device and a single assumed base station only, is merely exemplary and that more complex setups with a plurality of fields of view from the assumed position of the wireless device to a plurality of assumed base stations are generally conceivable. It will also be understood that other variants of describing the spatial pattern of blocking objects present in the fields of view between the selected position and the assumed positions of the one or more base stations are conceivable. In one such variant, a set of convolutional kernels representing different spatial patterns (e.g., filters) may be used, wherein the 3-dimensional point data may be filtered through this set of kernels. The kernels may in this context be representative of patterns having characteristically different propagation impacts, such as horizontal bars, metal bars, spotty patterns (e.g., leaves), or the like.

For an improved prediction of radio quality, absorption and/or reflection properties of the blocking objects present in the fields of view may additionally be taken into account. The absorption and/or reflection properties of the blocking objects may differ by the blocking objects' material properties and, in order to take account of such properties, each blocking object may be marked with information about its absorption and/or reflection qualities accordingly. These features may be determined as part of the blocking object features, i.e., in addition to the spatial pattern of the blocking objects. In other words, the determined blocking object features may further be indicative of at least one of absorption and reflection properties of the blocking objects present in the fields of view between the selected position and the assumed positions of the one or more base stations.

In one variant, such information may be obtained using conventional image recognition models (or algorithms) that can segment the pictures taken during the 3-dimensional environment scan and which may be trained to recognize common objects, such as industrial or office objects, including chairs, tables, cabinets, robotic arms, steel beams, etc., together with their typical absorption and/or reflection properties, for example. At least one of the absorption and reflection properties of a blocking object may thus be determined using an image recognition model trained with common blocking objects and at least one of their absorption and reflection properties. For certain blocking objects for which unambiguous image recognition may not be possible, such as to detect the blocking object material (e.g., to distinguishing brick walls and dry walls, which may visually not be possible), user-assisted marking of objects may be supported. When performing the 3-dimensional environment scan, a user moving around with the LIDAR sensor may thus be provided with software-assisted tools to mark objects of certain materials, e.g., by pressing on the screen when the object is in the view. The software may then help by image segmentation to apply the same type of material to a large section displayed on the screen and representative of the object. In case of a wall, for example, a single click may be sufficient to mark an entire wall section as being made from bricks, for example. Determining the at least one of the absorption and reflection properties of a blocking object may thus be assisted by manual marking of the blocking object input by a user on an image showing a field of view between the selected position and the assumed positions of the one or more base stations.

In another variant, the material and associated absorption and/or reflection properties of blocking objects may be collected by radio measurements. In one such variant, a test radio transmitter and a test radio receiver may be employed, wherein the transmitter and receiver may be placed around an object (for which the absorption and/or reflection properties may need to be ascertained) while measuring the received signal quality, such as when the object is in between the transmitter and receiver or when they are both placed behind or in front of the object, for example. The absorption and reflection properties may then be obtained based on the transmit/receive signal strength difference when the object is between the transmitter and receiver, or besides the transmitter and receiver, for example. At least one of the absorption and reflection properties of a blocking object may thus be determined from radio measurements performed between a radio transmitter and a radio receiver when being placed iteratively at different positions around the blocking object. As said, the measured signal strength difference between such positions may then be used to derive the absorption and/or reflection properties of the blocking object.

When evaluating radio signal coverage in the area to be covered by the wireless communication network, as described above, the fact that certain blocking objects may be movable may additionally be taken into consideration. To reflect such movability of objects, objects capable of moving may be recognized, their movement may be simulated, and the radio qualities may then be predicted under the assumption that the movable objects may move between respective places. The method performed by the computing unit 100 may thus further comprise identifying, among blocking objects detected in a 3-dimensional environment scan performed in the area, movable blocking objects capable of moving in the area, and simulating movement of the movable blocking objects, wherein, in order to obtain a predicted radio quality at a selected position, steps (a) and (b) may be repeatedly performed for different simulated movements of the movable blocking objects. In an industry hall, for example, production lines, robot arms, cranes, Automated Guided Vehicles (AGVs) and other moving objects may be modeled and the dynamics of the production may then be simulated in different scenarios while evaluating radio signal coverage in the environment, e.g., to reflect what would be the radio performance when a crane moves into the scene. In this way, the radio conditions may be inferred for many scenarios and radio signal coverage may be assured even in dynamically changing requirements.

As said, the predicted radio quality may be determined using a machine learning model which is trained to map spatial patterns of blocking objects to corresponding predicted radio qualities. Such model may need to be trained before it may be used for inference as described above. In the training phase, similar or equivalent measurements as described above may be performed in a representative environment (e.g., in a representative environment different from the environment in which the greenfield network deployment is made) to generate corresponding training data, including a 3-dimensional environment scan to collect 3-dimensional point data regarding the environment as well as measurements to determine the absorption and/or reflection properties of the blocking objects, for example. In addition, measurements may be performed to determine the corresponding radio conditions at each assessed position.

Based on the collected data, the model may then be trained to learn the mapping from the determined blocking object features to the corresponding predicted radio qualities. In the training phase, the determined blocking object features may thus be used as training input for the model and the corresponding measured radio qualities may be used as the output for the model. In other words, the machine learning model may be trained using training data comprising a plurality of sets of blocking object features as input data, each set of blocking object features associated with a different position of a wireless device with respect to one or more base stations of a representative wireless communication network, and corresponding radio qualities measured by the wireless device at the different positions as output data. In line with the above description, among the plurality of sets of blocking object features, each set of blocking object features may be indicative of a spatial pattern of blocking objects present in fields of view between the current position of the wireless device and the one or more base stations. The machine learning model may be a neural network which may be trained using conventional techniques, such as backpropagation, for example.

The measurements in the representative environment may be performed by a wireless device dedicated to generate training data which is moved around in the representative environment, wherein the wireless device may comprise a 3-dimensional environment scanner and a radio scanner, for example. The 3-dimensional environment scanner may be a LIDAR sensor, such as the LIDAR sensor described above, which may be used to collect information on 3-dimensional objects in the representative environment. From the 3-dimensional point data obtained from the LIDAR sensor, the position of the wireless device as well as the object positions in the environment may then be calculated using SLAM technology, as described above. The radio scanner, on the other hand, may be used to perform radio measurements to ascertain radio quality and may be given by Software Defined Radio (SDR) hardware combined with a radio signal processing stack, for example, which may be capable to measure detailed radio channel response characteristics, e.g., with a fine resolution both in time and frequency. The training data may then be generated by moving the wireless device the representative environment, i.e., in an area of the representative wireless communication network, and determining the sets of blocking object features and the corresponding radio qualities at different positions when moving the wireless device in the area. It will be understood that the training data may be supplemented by further data to refine the model, such as distance information regarding distances between the wireless device and the one or more base stations. The input data of the training data may thus further comprise, for each set of blocking features determined for a respective position when moving the wireless device in the area, distance information indicative of distances between the wireless device at the respective position and the one or more base stations.

The measurements performed by the wireless device may, as said, be performed in an equivalent manner in the representative environment as the measurements performed in the greenfield environment described above. Therefore, in order to avoid unnecessary repetitions, it may be summarized that, for a set of blocking object features, the spatial pattern of blocking objects may be determined from a 3-dimensional environment scan performed in the area of the representative wireless communication network. Like in the greenfield measurements, determining the spatial pattern of the blocking objects may comprise taking cross sections of the fields of view at different distances between the current position of the wireless device and the one or more base stations, and projecting blocking objects present in the fields of view at a particular distance onto the cross section at the particular distance. Also, determining the spatial pattern of the blocking objects may comprise calculating, for a cross section at a particular distance, a percentage of the cross section that is blocked by blocking objects at the particular distance.

The same may likewise apply to measurements performed to detect absorption and/or reflection properties of the blocking objects in the representative environment, i.e., like in the greenfield measurements, among the plurality of sets of blocking object features, each set of blocking object features may further be indicative of at least one of absorption and reflection properties of the blocking objects present in the fields of view between the current position of the wireless device and the one or more base stations. As described above, in one variant, at least one of the absorption and reflection properties of a blocking object may be determined using an image recognition model trained with common blocking objects and at least one of their absorption and reflection properties. Determining at least one of the absorption and reflection properties of a blocking object may be assisted by a manual marking of the blocking object input by a user on an image showing a field of view between the current position of the wireless device and the one or more base stations. As described above, in another variant, at least one of the absorption and reflection properties of a blocking object may be determined from radio measurements performed between a radio transmitter and a radio receiver when being placed iteratively at different positions around the blocking object.

It will be understood that, in a greenfield environment, as no base stations have been deployed yet, no radio measurements with respect to assumed base stations can be made. The situation may be different in the representative environment in which the training data is generated because, here, one or more base stations are actually installed and, therefore, radio measurements between the one or more base stations and the wireless device may be performed. As another variant of measuring absorption and/or reflection properties of blocking objects (which may be performed in the representative environment), the absorption and/or reflection properties of a particular blocking object may be calculated from the measured radio quality when the object is in the field of view towards a respective base station, i.e., when the blocking object blocks the view. Thus, in this variant, at least one of the absorption and reflection properties of a blocking object may be determined from radio measurements performed by the wireless device respect to the one or more base stations when the blocking object is in the fields of view between the wireless device and the one or more base stations.

Figure 4:
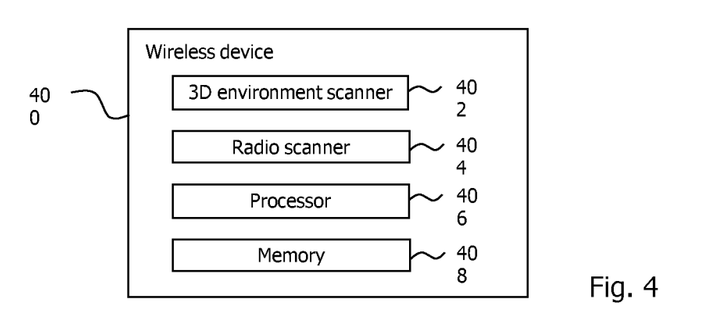
FIG. 4 illustrates an exemplary composition of a wireless device for generating training data according to the present disclosure.

The wireless device may be defined as a wireless device for generating training data usable to train a machine learning model for predicting radio quality in a wireless communication network depending on assumed positions of one or more base stations in an area to be covered by the wireless communication network. As said, the wireless device may comprise a 3-dimensional environment scanner and a radio scanner, wherein the wireless device may be configured to generate, using the 3-dimensional environment scanner, a plurality of sets of blocking object features as input data for the training data and corresponding radio qualities measured using the radio scanner at the different positions as output data for the training data. Each set of blocking object features may be associated with a different position of the wireless device with respect to one or more base stations of the representative wireless communication network, wherein, among the plurality of sets of blocking object features, each set of blocking object features may be indicative of a spatial pattern of blocking objects present in fields of view between a current position of the wireless device and the one or more base stations, as described above. An exemplary composition of such wireless device is illustrated in FIG. 4, which depicts a wireless device 400 including a 3-dimensional environment scanner 402 and a radio scanner 404 as well as at least one processor 406 and at least one memory 408. The at least one memory 408 may contain instructions executable by the at least one processor 406 such that the wireless device 400 is operable to carry out the operations described herein with respect to the wireless device for generating training data.

Figure 5:
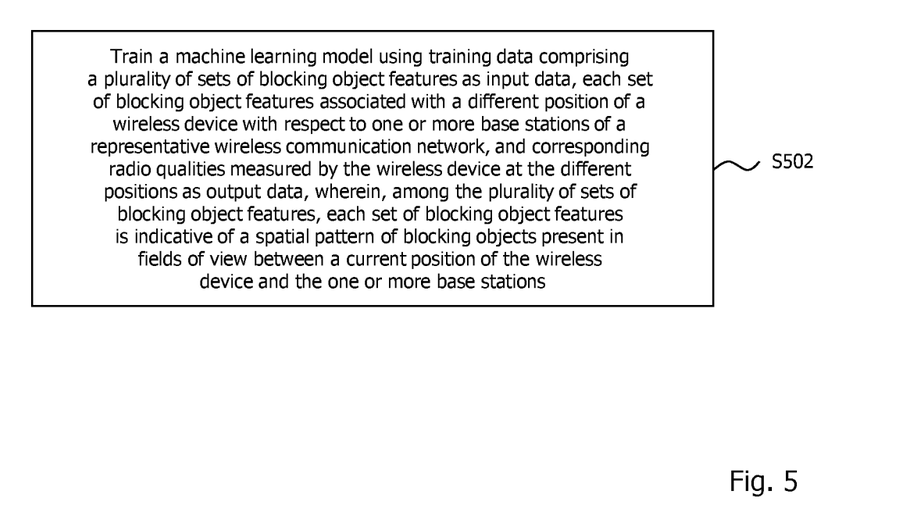
FIG. 5 illustrates a method which may be performed by the computing unit for training a machine learning model according to the present disclosure.

FIG. 5 illustrates a method which may be performed by the computing unit 110 according to the present disclosure. The method is dedicated to training a machine learning model configured to predict radio quality in a wireless communication network depending on assumed positions of one or more base stations in an area to be covered by the wireless communication network. In step S502, the computing unit 110 may train the machine learning model using training data comprising a plurality of sets of blocking object features as input data, each set of blocking object features associated with a different position of a wireless device with respect to one or more base stations of a representative wireless communication network, and corresponding radio qualities measured by the wireless device at the different positions as output data, wherein, among the plurality of sets of blocking object features, each set of blocking object features is indicative of a spatial pattern of blocking objects present in fields of view between a current position of the wireless device and the one or more base stations. The method according to FIG. 5 defines a method dedicated to train a machine learning model which, once it is trained, may be employed for the purpose of predicting radio quality in accordance with the method described above in relation to FIG. 2. As such, aspects described above with regard to the training of the machine learning model used in the method of FIG. 2 may be applicable to the operation of the computing unit 110 as well. Unnecessary repetitions are thus omitted at this point.

Figure 6:
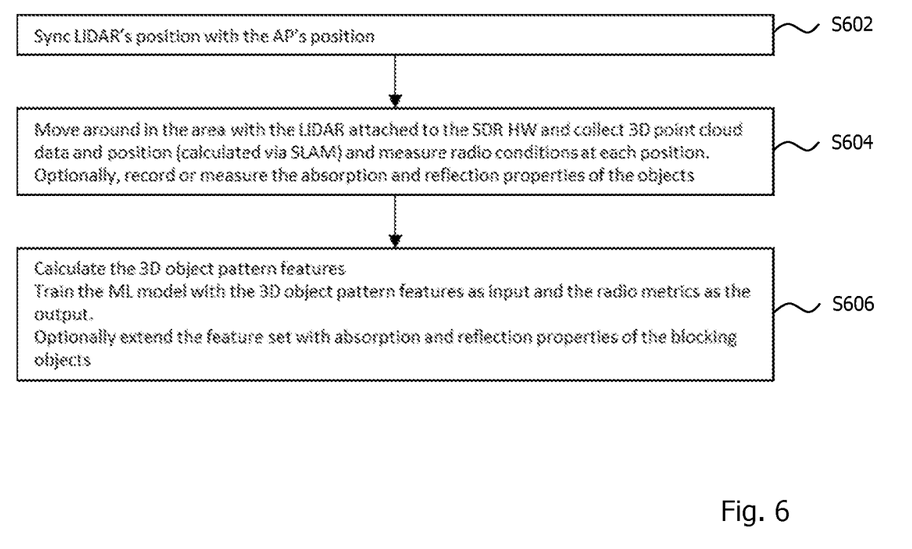
FIG. 6 illustrates an exemplary implementation of a training phase for the machine learning model according to the present disclosure.
Figure 7:
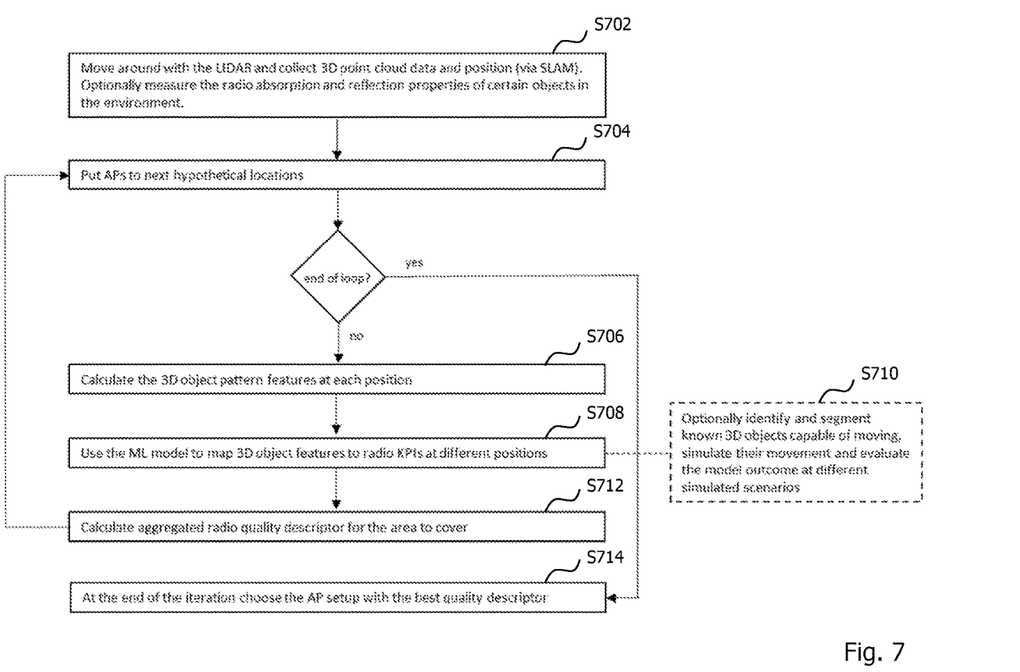
FIG. 7 illustrates an exemplary implementation of an inference phase in which the trained machine learning model is used according to the present disclosure.

The following FIGS. 6 and 7 illustrate exemplary method implementations which more specifically elucidate the training phase of the machine learning model as well as the subsequent inference phase in which the trained model is employed to predict radio qualities. It will be understood that these implementations are merely exemplary and are not to be considered limiting with respect to the above general description.

FIG. 6 illustrates an exemplary implementation of a training phase for the machine learning model in which, after the position of the LIDAR sensor of the wireless device is synchronized with the position of a base station (denoted access point "AP" in the figure) installed in the representative environment are synchronized in step S602, the wireless device including its LIDAR sensor and SDR hardware are moved around in the area in step S604 to collect 3-dimensional point data about the environment, optionally including data about the absorption and/or reflection properties, as described above, as well as data indicative of the corresponding radio qualities/conditions measured at each measurement point in the area. As said, the positions of both the wireless device and the objects in the environment may be calculated via SLAM technology, for example. Based on the measured data, blocking object features (denoted as "3D object pattern features" in the figure) are then calculated in step S606, wherein the resulting feature set may be extended with the measured absorption and/or reflection properties, if available. The machine learning model is then trained using the blocking object features as input and the corresponding radio qualities as output. After the training, the model may be used for inference and to determine the expected radio signal coverage at a previously not surveyed area, such as in a greenfield installation, for example.

FIG. 7 illustrates an exemplary implementation of an inference phase in which the trained model is used to plan the deployment of one or more base stations to cover a particular environment (or "space"), such as an industry hall, for example. Like in the training phase, a 3-dimensional environment scan of the space is performed in step S702 using a LIDAR sensor being moved around in the environment, wherein 3-dimensional point data, and optionally data regarding absorption and/or reflection properties of objects, as well as corresponding object positions are again determined via SLAM technology, for example. As the environment is a greenfield environment, no base stations are deployed yet and, hence, no radio measurements can be made. For a hypothetical installation of base stations (again denoted as access points "APs" in the figure) as determined in step S704, the blocking object features ("3D object pattern features") may be determined for a selected position in step S706, and the machine learning model may be used to map the blocking object features to corresponding radio qualities (denoted as Key Performance Indicators "KPIs" in the figure) at this position in step S708. These predictions may be performed at different selected positions in the environment to systematically predict radio quality throughout the space. As indicated in the figure, an additional step S710 may optionally be performed in which objects capable of moving may be identified, their movement may be simulated, and the radio qualities may be evaluated for different simulated scenarios, as described above. Based on these calculations, an aggregated radio quality descriptor representative of an evaluation of the radio signal coverage throughout the environment may then be determined in step S712. Such evaluation may be repeated for other (different) hypothetical installations of the one or more base stations, wherein the radio coverage may be inferred again, and the respective new installation may be evaluated accordingly. This process may be repeated until an optimal set of locations for the one or more base stations is determined. At the end of the iterative process, a base station setup resulting in a suitable (or best) evaluation may be chosen for the deployment of the base stations in the wireless communication network in step S714.

It will be understood that, when the environment is subject to a major change, such as when production lines in a factory are rebuilt, the above measurement process may be repeated to obtain an updated propagation model. This time, the process may be performed using the existing base station deployment, wherein the deployment may be reconsidered to achieve an optimal performance.

As has become apparent from the above, the present disclosure provides a technique for predicting radio quality in a wireless communication network depending on assumed positions of one or more base stations in an area to be covered by the wireless communication network. The presented technique may combine accuracy and detailed object modeling with simplified computational and more robust and tractable models compared to conventional approaches, via the use of AI based modeling during radio network planning. Object features derived from a detailed 3-dimensional environment scan with detailed radio measurements may be combined to obtain an accurate AI model of radio signal propagation that can be used in the planning of greenfield network deployments. An important benefit of the presented technique may be that accurate radio planning can be performed purely based on a 3-dimensional scan of the environment without doing any radio measurements. Also, improved radio planning results may be achieved as compared to conventional methods, such as pure ray tracing methods, as the presented technique may be less sensitive to local errors in the 3-dimensional model. The model may not directly be used to calculate the radio properties, but through an AI model, such as a neural network, trained on a large set of measurements and then be matched to the 3-dimensional point data measurements. In this context, the AI model may inherently compensate for inaccuracies in the 3-dimensional scanning.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for predicting radio quality in a wireless communication network depending on assumed positions of one or more base stations in an area to be covered by the wireless communication network, the method being performed by a computing unit and comprising the steps of:
   (a) determining, for a selected position in the area with respect to assumed positions of the one or more base stations, blocking object features indicative of a spatial pattern of blocking objects present in fields of view between the selected position and the assumed positions of the one or more base stations, wherein the spatial pattern of the blocking objects is determined from a 3-dimensional environment scan performed in the area, wherein determining the spatial pattern of the blocking objects comprises calculating, for a cross section at a particular distance, a percentage of the cross section being blocked by blocking objects at the particular distance; and
   (b) determining, based on the determined blocking object features, a predicted radio quality at the selected position using a machine learning model trained to map blocking object features for selected positions with respect to one or more base station positions to corresponding radio qualities at the selected positions.

2. The method of claim 1, wherein steps (a) and (b) are performed for a plurality of different selected positions in the area with respect to the assumed positions of the one or more base stations to thereby obtain predicted radio qualities at the different selected positions, wherein the method further comprises:
   (c) evaluating, based on the predicted radio qualities, a placement of the one or more base stations in the wireless communication network at the assumed positions.

3. The method of claim 2, wherein steps (a) to (c) are performed for a plurality of different assumed positions of the one or more base stations in the area to thereby obtain evaluations of different placements of the one or more base stations in the wireless communication network, wherein the method further comprises:
   (d) selecting, based on the evaluations, a placement of the one or more base stations for deployment of the one or more base stations in the wireless communication network.

4. The method of claim 1, wherein determining the spatial pattern of the blocking objects comprises:
   taking cross sections of the fields of view at different distances between the selected position and the assumed positions of the one or more base stations; and
   projecting blocking objects present in the fields of view at a particular distance onto the cross section at the particular distance.

5. The method of claim 1, wherein the determined blocking object features are further indicative of at least one of absorption and reflection properties of the blocking objects present in the fields of view between the selected position and the assumed positions of the one or more base stations.

6. The method of claim 5, wherein at least one of the absorption and reflection properties of a blocking object is determined using an image recognition model trained with common blocking objects and at least one of their absorption and reflection properties.

7. The method of claim 6, wherein determining the at least one of the absorption and reflection properties of a blocking object is assisted by a manual marking of the blocking object input by a user on an image showing a field of view between the selected position and the assumed positions of the one or more base stations.

8. The method of claim 5, wherein at least one of the absorption and reflection properties of a blocking object is determined from radio measurements performed between a radio transmitter and a radio receiver when being placed iteratively at different positions around the blocking object.

9. The method of claim 1, further comprising:
   identifying, among blocking objects detected in a 3-dimensional environment scan performed in the area, moveable blocking objects capable of moving in the area; and
   simulating movement of the movable blocking objects, wherein, in order to obtain a predicted radio quality at a selected position, steps (a) and (b) are repeatedly performed for different simulated movements of the movable blocking objects.

10. The method of claim 1, wherein the machine learning model is trained using training data comprising a plurality of sets of blocking object features as input data, each set of blocking object features associated with a different position of a wireless device with respect to one or more base stations of a representative wireless communication network, and corresponding radio qualities measured by the wireless device at the different positions as output data.

11. The method of claim 10, wherein, among the plurality of sets of blocking object features, each set of blocking object features is indicative of a spatial pattern of blocking objects present in fields of view between the current position of the wireless device and the one or more base stations.

12. The method of claim 10, wherein the training data is generated by moving the wireless device in an area of the representative wireless communication network and determining the sets of blocking object features and the corresponding radio qualities at different positions when moving the wireless device in the area.

13. The method of claim 12, wherein the input data of the training data further comprises, for each set of blocking features determined for a respective position when moving the wireless device in the area, distance information indicative of distances between the wireless device at the respective position and the one or more base stations.

14. The method of claim 10, wherein, for a set of blocking object features, the spatial pattern of the blocking objects is determined from a 3-dimensional environment scan performed in the area of the representative wireless communication network.

15. The method of claim 14, wherein determining the spatial pattern of the blocking objects comprises:
- taking cross sections of the fields of view at different distances between the current position of the wireless device and the one or more base stations; and
- projecting blocking objects present in the fields of view at a particular distance onto the cross section at the particular distance.

16. The method of claim 14, wherein determining the spatial pattern of the blocking objects comprises calculating, for a cross section at a particular distance, a percentage of the cross section that is blocked by blocking objects at the particular distance.

17. A method for training a machine learning model configured to predict radio quality in a wireless communication network depending on assumed positions of one or more base stations in an area to be covered by the wireless communication network, the method being performed by a computing unit and comprising:
- training the machine learning model using training data comprising a plurality of sets of blocking object features as input data, each set of blocking object features associated with a different position of a wireless device with respect to one or more base stations of a representative wireless communication network, and corresponding radio qualities measured by the wireless device at the different positions as output data, wherein, among the plurality of sets of blocking object features, each set of blocking object features is indicative of a spatial pattern of blocking objects present in fields of view between a current position of the wireless device and the one or more base stations, wherein the spatial pattern of the blocking objects is determined from a 3-dimensional environment scan performed in the area, wherein determining the spatial pattern of the blocking objects comprises calculating, for a cross section at a particular distance, a percentage of the cross section being blocked by blocking objects at the particular distance.

18. A wireless device for generating training data usable to train a machine learning model for predicting radio quality in a wireless communication network depending on assumed positions of one or more base stations in an area to be covered by the wireless communication network, the wireless device comprising:
- a 3-dimensional environment scanner; and
- a radio scanner,
- wherein the wireless device is configured to generate, using the 3-dimensional environment scanner, a plurality of sets of blocking object features as input data for the training data and corresponding radio qualities measured using the radio scanner at the different positions as output data for the training data,
- wherein each set of blocking object features is associated with a different position of the wireless device with respect to one or more base stations of a representative wireless communication network, and wherein, among the plurality of sets of blocking object features, each set of blocking object features is indicative of a spatial pattern of blocking objects present in fields of view between a current position of the wireless device and the one or more base stations, wherein the spatial pattern of the blocking objects is determined from a 3-dimensional environment scan performed in the area, wherein determining the spatial pattern of the blocking objects comprises calculating, for a cross section at a particular distance, a percentage of the cross section being blocked by blocking objects at the particular distance.

* * * * *